United States Patent
Solh et al.

(10) Patent No.: US 10,148,869 B1
(45) Date of Patent: *Dec. 4, 2018

(54) SYSTEMS AND METHODS FOR DETERMINING A DEPTH OR REFLECTANCE OF OBJECTS

(71) Applicant: Amazon Technologies, Inc., Seattle, WA (US)

(72) Inventors: Mashhour Solh, San Jose, CA (US); Tsz Lok Poon, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/876,313

(22) Filed: Jan. 22, 2018

Related U.S. Application Data

(63) Continuation of application No. 15/058,566, filed on Mar. 2, 2016, now Pat. No. 9,912,861.

(51) Int. Cl.
| | |
|---|---|
| *H04N 5/232* | (2006.01) |
| *G06K 9/00* | (2006.01) |
| *G06T 7/50* | (2017.01) |
| *H04N 5/235* | (2006.01) |

(52) U.S. Cl.
CPC ..... *H04N 5/23219* (2013.01); *G06K 9/00228* (2013.01); *G06T 7/50* (2017.01); *H04N 5/2354* (2013.01); *H04N 5/23212* (2013.01)

(58) Field of Classification Search
CPC ........... H04N 5/23219; H04N 5/23212; H04N 5/2354; H04N 5/2352; G06K 9/00221; G06K 5/00228; G06K 5/00268; G06K 5/00335; G06K 5/00342; G06K 5/00362; G06T 7/00; G06T 7/0051
USPC ........................................................ 348/348
See application file for complete search history.

(56) References Cited

U.S. PATENT DOCUMENTS

| | | | |
|---|---|---|---|
| 6,388,756 B1* | 5/2002 | Ho | G01B 11/22 356/446 |
| 7,403,707 B2* | 7/2008 | Raskar | G03B 7/16 348/207.99 |
| 7,711,257 B2* | 5/2010 | Tamminen | G03B 7/16 348/366 |
| 8,106,954 B2 | 1/2012 | Sato | |
| 8,953,849 B2 | 2/2015 | Hanna | |
| 9,002,074 B2 | 4/2015 | Nagashima | |
| 9,638,791 B2* | 5/2017 | Lou | G01S 7/4865 |
| 9,661,215 B2* | 5/2017 | Sivan | H04N 19/597 |
| 9,830,506 B2* | 11/2017 | Short | G06K 9/00288 |
| 2003/0043290 A1 | 3/2003 | Sasaki | |

(Continued)

*Primary Examiner* — Pritham Prabhakher
(74) *Attorney, Agent, or Firm* — Evershed Sutherland (US) LLP

(57) ABSTRACT

Systems, methods, and computer-readable media are disclosed for determining a depth or reflectance of objects. Example methods may include illuminating a scene within a field of view of a device at a first illuminance value, detecting a reflected illuminance value, and determining a first reflectance value for a first object in the scene. Example methods may include identifying the first object, determining an orientation of the first object, and determining an estimated distance between the device and the first object based at least in part on the first illuminance value, the reflected illuminance value, and the first reflectance value.

20 Claims, 9 Drawing Sheets

(56) References Cited

U.S. PATENT DOCUMENTS

| | | | |
|---|---|---|---|
| 2006/0104488 A1* | 5/2006 | Bazakos | G06K 9/00255 |
| | | | 382/118 |
| 2008/0089561 A1 | 4/2008 | Zhang | |
| 2008/0124067 A1 | 5/2008 | Eliasson | |
| 2009/0033753 A1 | 2/2009 | Sato | |
| 2010/0246904 A1 | 9/2010 | Yamashita | |
| 2013/0182915 A1 | 7/2013 | Hanna | |
| 2014/0112550 A1 | 4/2014 | Hanna | |
| 2014/0146304 A1 | 5/2014 | Almalki | |
| 2015/0339515 A1 | 11/2015 | Tomita | |
| 2016/0080079 A1* | 3/2016 | Kuraki | H04B 10/116 |
| | | | 398/25 |
| 2016/0113517 A1 | 4/2016 | Lee | |
| 2016/0182809 A1* | 6/2016 | Plaza | G02B 7/28 |
| | | | 348/349 |
| 2016/0198100 A1 | 7/2016 | Cho | |
| 2016/0227113 A1 | 8/2016 | Horesh | |
| 2016/0227182 A1* | 8/2016 | Uekusa | H04N 5/2354 |
| 2016/0370459 A1 | 12/2016 | Shirashi | |
| 2016/0377708 A1* | 12/2016 | Lou | G01S 7/4865 |
| | | | 348/221.1 |
| 2017/0061210 A1 | 3/2017 | Ollila | |
| 2017/0132458 A1* | 5/2017 | Short | G06K 9/00288 |
| 2017/0230649 A1* | 8/2017 | Galor Gluskin | H04N 17/002 |

* cited by examiner

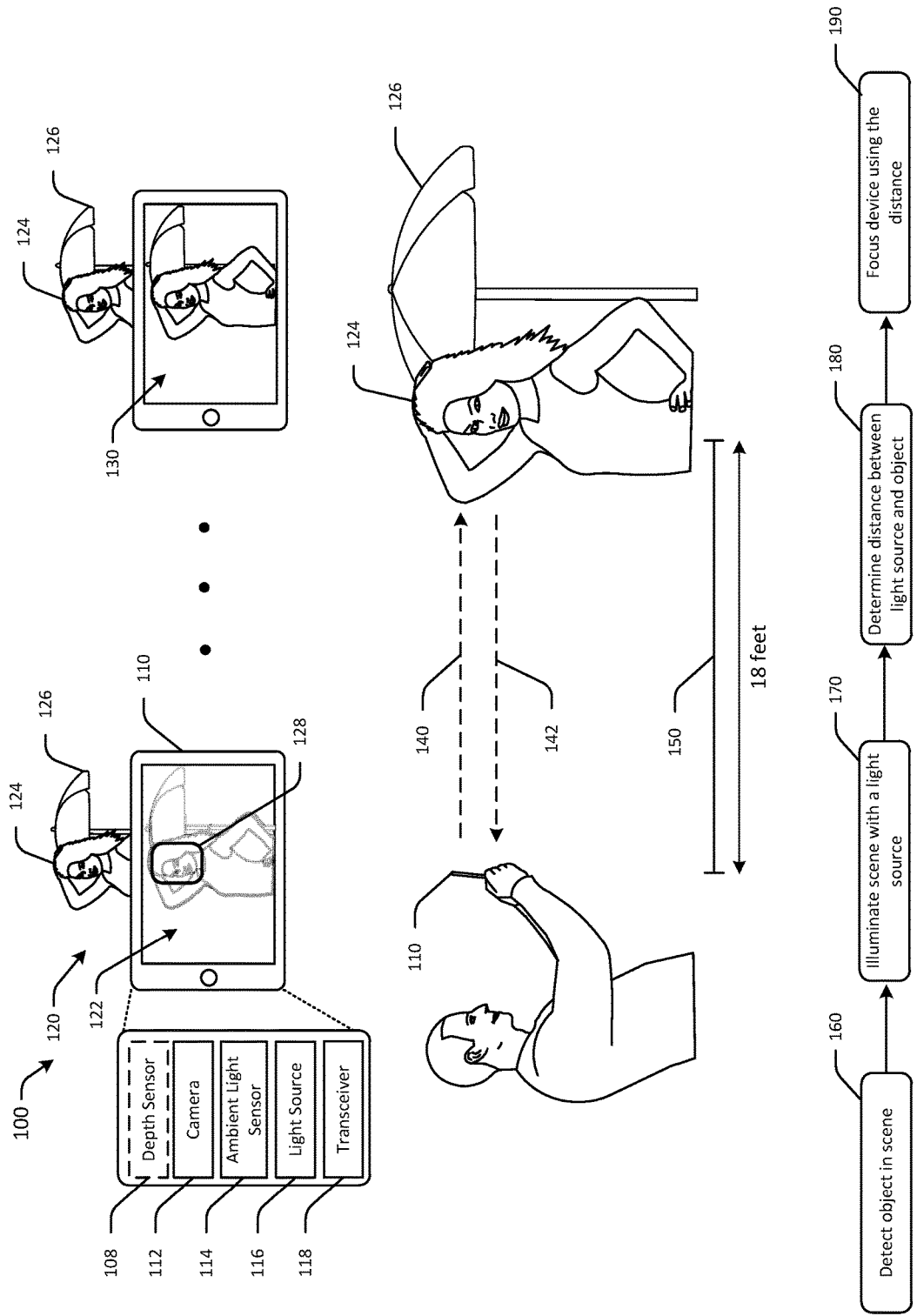

Object Reflectance Table 390

| Object Description | Material | Orientation Angle | Illumination (lux) | Distance (m) | Reflectance Value (lux) |
|---|---|---|---|---|---|
| Soda Can | Aluminum | 0 | 50 | 2 | 80 |
|  |  | 45 | 50 | 2 | 75 |
|  |  | 90 | 50 | 2 | 50 |
| Human Skin | Skin | 0 | 50 | 2 | 40 |
| T Shirt | Cotton | 0 | 50 | 2 | 30 |
| Glass | Glass | 0 | 50 | 2 | 65 |
| Banana | n/a | 0 | 50 | 2 | 29 |
| Table | Wood | 0 | 50 | 2 | 3 |
| ... | ... | ... | ... | ... | ... |

FIG. 3B

SYSTEMS AND METHODS FOR DETERMINING A DEPTH OR REFLECTANCE OF OBJECTS

CROSS-REFERENCE TO RELATED APPLICATION

This application is a continuation of application Ser. No. 15/058,566, filed Mar. 2, 2016, the entirety of which is hereby incorporated by reference.

BACKGROUND

Certain characteristics or settings of devices may be optimized based on a distance between a device and a particular object. For example, focusing a camera lens may be dependent on a distance between the camera lens and a subject of an image. However, determining a distance or a depth of the subject with respect to the camera or another device may be difficult depending on device hardware and capabilities, as well as a complexity of the surroundings of the subject in the image for which the depth or distance is to be determined.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 1 is a hybrid schematic and process flow diagram of an example use case for determining a depth of objects in accordance with one or more example embodiments of the disclosure.

FIGS. 3A-3B depict a hybrid system architecture and process flow diagram, and an example reflectance table, in accordance with one or more example embodiments of the disclosure.

DETAILED DESCRIPTION

Overview

Figure 2A:
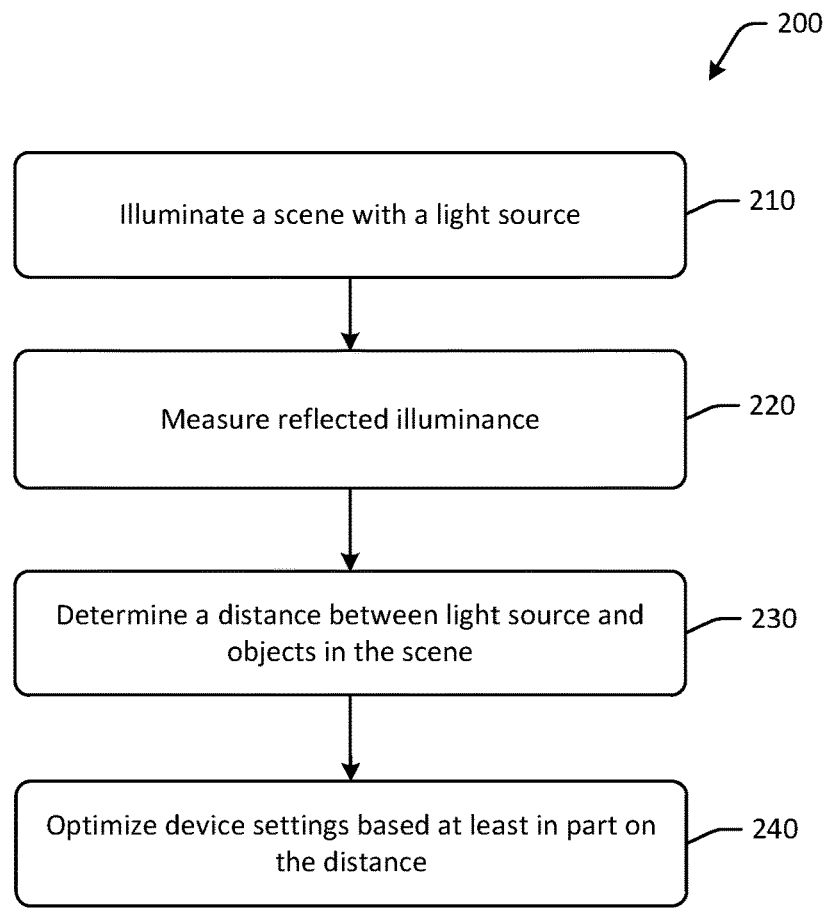
FIGS. 2A-2B depict process flow diagrams of illustrative methods for determining a depth or a reflectance of objects in accordance with one or more example embodiments of the disclosure.

This disclosure relates to, among other things, devices, systems, methods, computer-readable media, techniques, and methodologies for determining a depth or reflectance of objects. A depth of an object may be referred to herein as a distance between one or more devices or device components and one or more objects. Distances may be estimated distances and/or an estimated range of distances. For example, certain embodiments of the disclosure may determine that an object is at a depth or a distance of between about 10 centimeters and 14 centimeters, while other embodiments may determine that an object is at a depth or a distance of 17 centimeters. Using the distances or range of distances determined by embodiments of the disclosure, certain characteristics or settings of devices may be modified. For example, a camera lens may be automatically focused, or sound emitted from a speaker may be directed towards a person. Certain embodiments of the disclosure may determine an object depth by using illumination generated by a light source having a known intensity or illuminance. For example, a scene or an ambient environment of a device may be illuminated by a light source. One or more objects, such as people, furniture, trees, and other objects may be within the scene. The device may measure an amount of light reflected, or reflected illuminance, from objects within the scene. Reflected illuminance may be measured in candelas per square meter and may be representative of a brightness of a scene at a particular illumination and distance. For example, in full daylight, reflected illuminance may be measured to be 1,000 candelas/m$^2$, while in starlight, reflected illuminance may be 0.0001 candelas/m$^2$. In some embodiments, the device may determine a reflectance value for one or more objects in the scene, while in other embodiments the device may wirelessly communicate with one or more remote server(s) to determine a reflectance value. The reflectance value for an object may be based at least in part on a material from which the object is formed (e.g., different materials may have different reflectance values, etc.). Reflectance values may be represented in lux (e.g., lumens per square meter, etc.), and may be indicative of a relative brightness of an object. For example, an aluminum can may have a reflectance value of 80 lux when illuminated at a certain intensity, while a wall with a matte finish may have a reflectance value of 10 lux. Using the reflected illuminance and object reflectance, embodiments of the disclosure may determine a distance between an object and the device. Upon determining the distance, the device may optimize one or more characteristics or settings. For example, a camera may autofocus on a human face in a visual representation of the scene, or a device may direct audio towards a human at a particular intensity based at least in part on how far the human is from the device.

Certain embodiments of the disclosure may determine a reflectance of objects in addition to, or instead of, determining a depth or distance of objects. Determined reflectance may be used to adjust certain settings or characteristics of devices.

Certain embodiments of the disclosure may include object recognition functionality. For example, embodiments of the disclosure may be configured to execute an object recognition algorithm designed to recognize human faces. Such embodiments may implement the depth or distance determination aspects of the disclosure to determine a distance between a device and a human face or other desired recognized object.

Embodiments of the disclosure may determine a depth or a distance of objects based at least in part on a reflectance of an object, and may also determine a reflectance of objects based at least in part on a distance or depth of the object. Certain embodiments may include a reflectance library that includes expected reflectance values of objects in various orientations. Using the reflectance library, embodiments of the disclosure may compare detected or measured reflectance values to one or more values in the reflectance library to identify objects and/or a specific orientation of an object. A reflectance library may include empirical data relating to reflectance values of certain objects or materials in certain orientations. For example, a reflectance library may include a first reflectance value for an aluminum soda can in a first orientation, and a second reflectance value for the aluminum soda can in a second orientation. The reflectance library may include reflectance data for objects at a fixed distance. Using the reflectance library, objects or materials in a scene may be recognized, and/or distances between a light source and an object may be determined.

Referring to FIG. 1, an example use case for determining a depth of objects and/or determining a reflectance of objects is illustrated in accordance with one or more example embodiments of the disclosure. In the example of FIG. 1, a device 110 in an ambient environment 100 is depicted. The ambient environment 100 may include one or more objects in the ambient environment surrounding or partially surrounding the device 110. The device 110 may be any suitable device, such as a smartphone, a tablet, a laptop computer, a standalone computing device, and the like. For example, the device 100 of FIG. 1 may be a smartphone and may include an optional depth sensor 108, a camera 112, an ambient light sensor 114, a light source 116, and a transceiver 118. The camera 112 may include one or more lenses and may be a stereo camera, a depth camera and/or an RGB ("red, green, and blue") camera. For example, the camera 112 may include time-of-flight functionality in order to determine distance based at least in part on the speed of light. Other embodiments may include light field, structured light, or other methods of determining depth. The camera 112 may have a field of view 120 that captures a visual representation of a scene 122, or a portion of the surrounding ambient environment 100. The field of view 120 or the scene 122 may be presented in real-time on a display of the device 110. The display may be configured to display the field of view 120 of the lens of the camera 112. In the example of FIG. 1, the scene 122 may include a person 124 and a beach umbrella 126.

The device 110 may include an object recognition algorithm configured to identify one or more objects in the scene 122. For example, the device 110 may include an object recognition algorithm trained to identify human faces. Accordingly, the device 110 may identify the human face of the person 124 and may present or overlay a bounding box 128 on the human face recognized in the scene 122. In instances where more than one human face is recognized in a scene, additional bounding boxes may be presented. Certain embodiments may include object recognition functionality for different or multiple objects, while other embodiments may not include object recognition functionality.

Upon identifying the human face, the device 110 may use the light source 116 to illuminate the scene 122. The light source 116 may be, for example, a camera flash device configured to generate artificial light at a known first illuminance value or light intensity (e.g., 100 lumens, etc.), or the light source 116 may be another device configured to generate light at a known intensity, such as a device configured to generate infrared light or other invisible light. The light source 116 may be calibrated to a certain illuminance value. When the light source 116 is activated or triggered so as to illuminate the scene 122, generated light 140 may be directed towards the scene 122, and in particular, towards the person 124 and the beach umbrella 126. The generated light 140 may reflect off of the person 124 and the beach umbrella 126 as reflected illuminance 142, or light reflected off of one or more objects. The reflected illuminance 142 may be detected or determined by the light sensor 114 and/or the camera 112, or with another component of the device 110. In certain embodiments, an amount of ambient light incident upon the camera 112 may be determined or measured before the light source 116 is activated, so as to provide a frame of reference or baseline that can be used to determine a change in ambient light when the light source 116 is activated.

In certain embodiments, for example in instances where the camera 112 includes a depth sensor or other distance determination functionality, a distance 150 between the device 110 and the human face may be determined. For example, time-of-flight may be used to determine the distance 150 between the device 110 and the human face. In other embodiments, an expected reflectance value of a human face may be known, and the distance 150 may therefore be calculated by the device 110. In certain embodiments, the measured reflectance value may be within a predetermined tolerance of the expected reflectance value, such as within about 5% or within about 10%, or within an absolute number range of the expected value.

In instances where the expected reflectance value for a human face is unknown, the depth sensor may be used to determine the distance between the device 110 and the human face. For example, the distance 150 may be determined to be 18 feet. Upon determining the depth or the distance using the depth sensor, an image of the scene 122 may be captured using the RGB camera. The image may include at least one pixel with a pixel value of between 0 and 255 that represents a brightness of the pixel. Using the known intensity of the light source 114, the measured depth, and the captured image, the reflectance of the human face, or an estimated reflectance of the human face, may be calculated. In some instances, the reflectance of the human face may be estimated based at least in part on one or more pixels in the captured image. In certain embodiments, reflectance of objects in a scene may be determined as a function of distance, light source illuminance, and measured illuminance.

Upon determining the reflectance of the subject of the image, or the human face, one or more settings or characteristics of the device 110 may be optimized. For example, a camera lens of the camera 112 may be focused, and/or exposure settings of the camera 112 may be adjusted so as to optimize the image quality of captured images. Accordingly, optimal exposure settings for the camera 112 may be set based at least in part on the determined reflectance of the human face.

In instances where the expected reflectance value for a human face is known (e.g., reflectance data for human faces is available in a reflectance library, etc.), embodiments of the disclosure may determine the distance 150 between the device 110 and the human face. For example, the distance 150 may be determined without time-of-flight functionality or a depth sensor. Upon illuminating the scene 122 with the light source 116, the ambient light sensor 114 of the device 110 may detect or measure the reflected illuminance 142 while the scene 122 is illuminated. Light traveling from the light source 116 to the objects in the scene 122 will be reflected back towards the ambient light sensor 114. A reflectance value for the human face may be determined based at least in part on the reflected illuminance 142. In some embodiments, the device 110 may determine that the reflectance value corresponds to an expected reflectance value for human faces in front facing orientations, or when the human face is facing the camera. The expected reflectance value may represent an expected reflectance of incident light from human faces.

Using the known illuminance of the light source 116, the measured or detected reflected illuminance 142, and the reflectance of the human face or the subject, embodiments of the disclosure may determine the distance 150, or an estimated distance, indicative of the distance the light traveled. Using a reflectance library and the detected reflectance values, the human face of the person 124 can be distinguished from the beach umbrella 126, as each is formed of a different material with a different reflectance value. Settings or characteristics of the device 110 may be optimized using the calculated distance 150. For example, the camera 112 may be autofocused using the calculated distance 150. In instances with multiple human faces or subjects in a scene, embodiments of the disclosure may recognize a second human face using object recognition functionality and/or may determine a second reflectance value for the second human face. A second estimated distance between the device 110 and the second human face may be determined, and an average of the distance 150 and the second distance may be used in adjusting an exposure or a focus of the camera 112. In addition, an orientation of one or more objects in a scene may be determined by matching a detected reflectance value to an expected reflectance value for an object in a particular orientation. For example, the detected reflectance value may be compared to a set of reflectance values stored in a reflectance table, where an object orientation may be associated with an expected reflected illuminance value in the reflectance table.

A process flow illustrated in FIG. 1 illustrates an example method of determining a distance of objects. At block 160, an object is detected or recognized in a scene. At block 170, the scene is illuminated with a light source. At block 180, a distance or depth between the light source and the detected object is determined. At block 190, a device is focused using the determined distance. In some embodiments, distance may be determined by a depth sensor, and in such instances, reflectance of an object may be determined in order to optimize exposure, for example.

Embodiments of the disclosure may therefore optimize one or more device settings or characteristics based at least in part on a determined depth and/or reflectance of one or more objects. For example, camera settings, such as autofocus and exposure, may be adjusted based at least in part on a distance between a camera and subjects of an image. In another example, stereo speaker settings may be adjusted based at least in part on a distance and/or orientation of a person listening to the speaker.

The systems, methods, computer-readable media, techniques, and methodologies for determining a depth or reflectance of objects may be used to improve functionality and/or performance of various devices, which may result in optimized device settings or characteristics being automatically determined, thereby reducing user input and improving user experience.

Example embodiments of the disclosure provide a number of technical features or technical effects. For example, in accordance with example embodiments of the disclosure, certain devices may be configured to automatically determine distances and/or reflectance values of objects, and use the determined values to modify or adjust one or more device settings so as to optimize device performance. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

FIG. 2A depicts an example process flow 200 for determining a depth of objects in accordance with one or more embodiments of the disclosure. The process flow 200 may be implemented in instances where reflectance data for one or more objects is available, either locally or remotely. While example embodiments of the disclosure may be described in the context of cameras and/or speakers, it should be appreciated that the disclosure is more broadly applicable to any electronic device.

At block 210 of the process flow 200, a scene is illuminated with a light source. The light source may be configured to generate visible or invisible light, such as infrared light. The light source may be configured to generate light at a predetermined illuminance or intensity, such as 400 lux. In instances where the light source is configured to generate infrared light, the reflected infrared light may be used as an estimate for visible light reflectance. For objects that have infrared reflective colors, an object recognition algorithm may be used to locate or identify such objects in a scene.

At block 220, a reflected illuminance is measured. For example, an ambient light sensor may be used to measure reflected illuminance. The reflected illuminance may be light generated by the light source that reflects off of one or more objects in the scene and is detected by, for example, the ambient light sensor.

At block 230, a distance between the light source and one or more objects in the scene is determined. The distance may be an estimated distance and may be a range of distances. The distance, or the depth, may be determined based at least in part on the illuminance of the light source, the reflected illuminance, and a reflectance of objects in the scene. To determine an estimated depth, embodiments of the disclosure may calculate the distance using the following formulae:

To characterize the light source (Y), $$Y_{CHAR} = \text{ILLUM}_{CHAR} * (1/D\text{IST}_{CHAR}^2) * 18\% * (1/D\text{IST}_{CHAR}^2) * \text{ConvertRatio}$$

where the ConvertRatio is dependent upon a sensitivity of the device.

To determine Y (from the viewpoint of the device) when the light source is activated, $$Y = \text{ILLUM}_{TORCH} * (1/D\text{IST}^2) * \text{Reflect} * (1/D\text{IST}^2) * \text{ConvertRatio}$$

Combining the equations yields:

$$\frac{Y_{CHAR} * DIST^4_{CHAR}}{Y * DIST^4} = \frac{ILLUM_{CHAR} * 18\%}{ILLUM_{TORCH} * REFLECT}$$

Therefore, distance can be calculated as follows:

$$DISTANCE = \sqrt[4]{\frac{(REFLECT * Y_{CHAR} * DIST^4_{CHAR} * ILLUM_{TORCH})}{(Y * ILLUM_{CHAR} * 18\%)}}$$

where:
REFLECT is the object reflectance value;
$ILLUM_{TORCH}$ is the illuminance of the activated light source;
$ILLUM_{CHAR}$ is the illuminance of the activated light source for characterization;
ConvertRatio is the conversion ratio from illuminance to the camera sensor brightness Y value;
$Y_{CHAR}$ is the sensor brightness Y obtained at characterization;
$DIST_{CHAR}$ is the distance for LED light characterization;
DISTANCE is the object distance; and
18% is a midtone gray target and can be substituted with any appropriate value.

At block 240, device settings may be optimized based at least in part on the distance. For example, the distance of an object can be used to optimize beam forming for audio or image segmentation for object recognition. In another example, exposure settings of a camera device may be adjusted or optimized based at least in part on the distance.

Figure 2B:
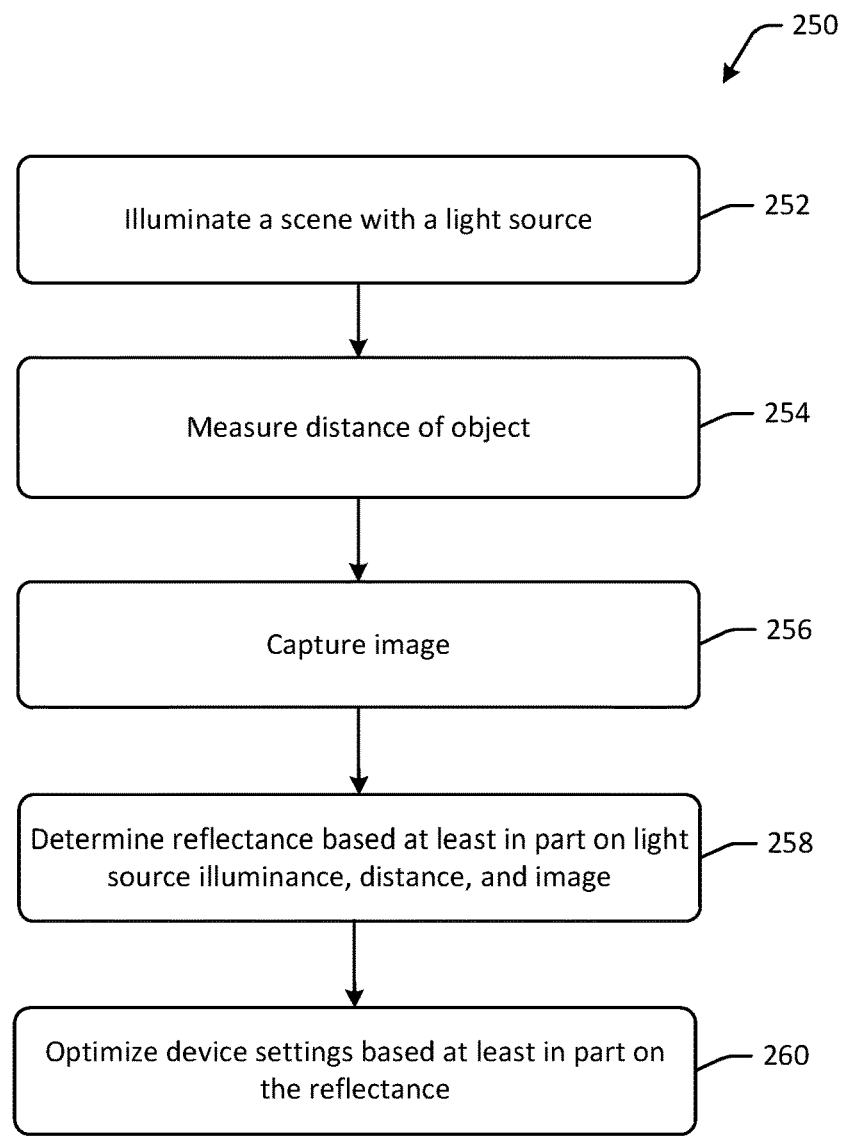

FIG. 2B depicts an example process flow 250 for determining a reflectance of objects in accordance with one or more embodiments of the disclosure. The process flow 250 may be implemented in instances where object depth can be determined. While example embodiments of the disclosure may be described in the context of cameras and/or speakers, it should be appreciated that the disclosure is more broadly applicable to any electronic device.

At block 252 of the process flow 250, a scene is illuminated with a light source. The light source may be configured to generate visible or invisible light, such as infrared light. The light source may be configured to generate light at a predetermined illuminance or intensity, such as 400 lux. In instances where the light source is configured to generate infrared light, the reflected infrared light may be used as an estimate for visible light reflectance. For objects that have infrared reflective colors, an object recognition algorithm may be used to locate or identify such objects in a scene.

At block 254, a distance of an object is measured using a depth sensor, such as a stereo camera, time of flight, structured light, light field, or another suitable method. At block 256, an image is captured using, for example, an RGB camera. At block 258, reflectance, or estimated reflectance, is determined based at least in part on the light source illuminance, the distance, and the captured image. To determine an estimated reflectance, embodiments of the disclosure may use the following formula, derived from the formulae above:

$$REFLECTANCE = \frac{ILLUM_{CHAR}}{ILLUM_{TORCH}} * 18\% * \frac{Y * DIST^4}{Y_{CHAR} * DIST^4_{CHAR}}$$

Where the ratio of $ILLUM_{CHAR}$ to $ILLUM_{TORCH}$ is light intensity compared to a current light characterization and object distance from the object depth detection. Accordingly, reflectance may be determined as a function of distance, light source illumination, and measured illuminance.

At block 260, device settings may be optimized based at least in part on the reflectance. For example, exposure settings for a camera may be adjusted to improve image quality.

Figure 3A:
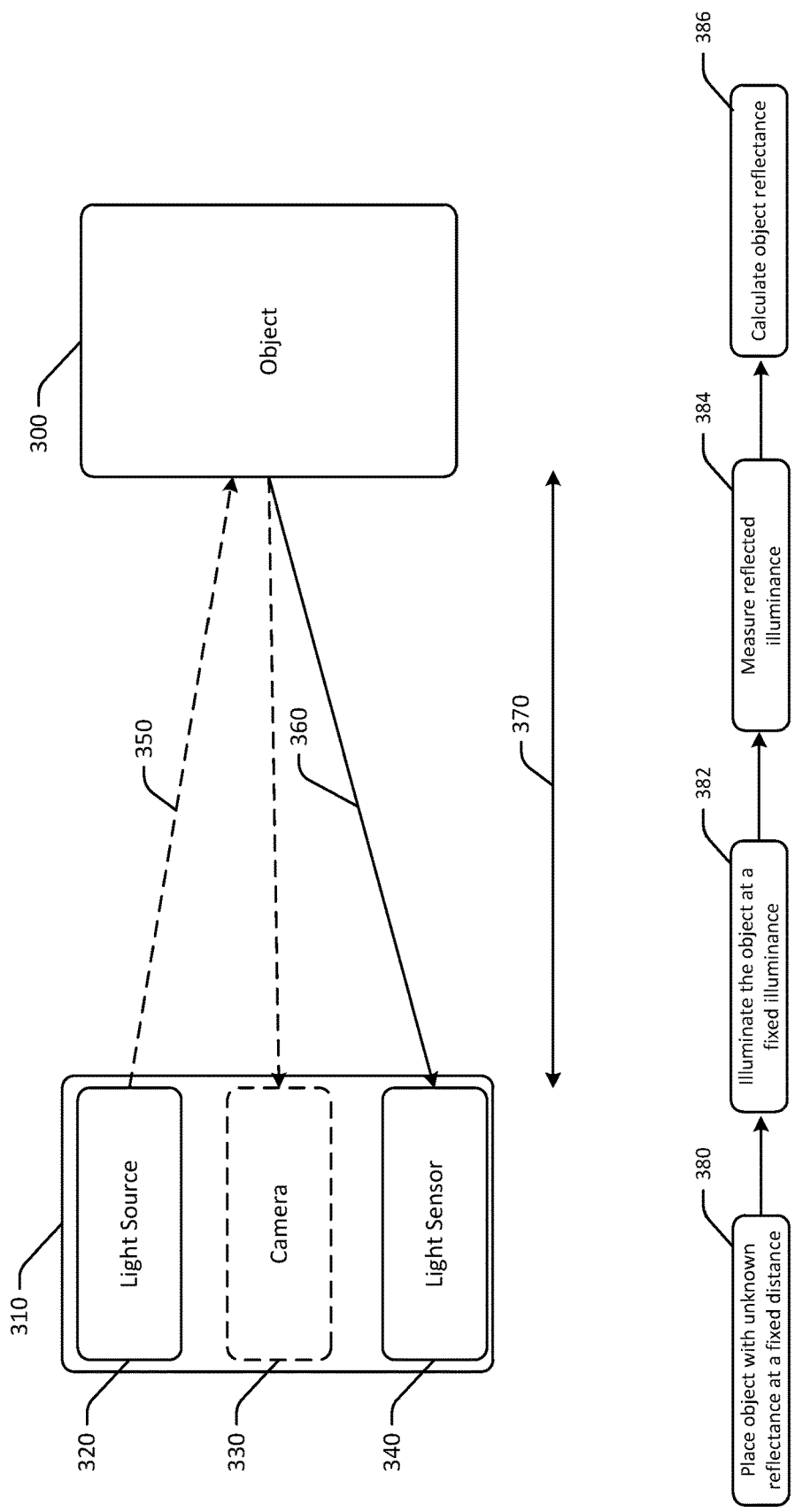

FIG. 3A is a hybrid system architecture and process flow diagram for calibrating reflectance values in accordance with one or more example embodiments of the disclosure. FIG. 3A includes an object 300 and a device 310. The device 310 may be any suitable device, such as a smartphone or tablet, and may include a light source 320. The intensity or illuminance of the light source 320 may be predetermined. The device 310 may optionally include a camera 330, and a light sensor 340.

At block 380 of the process flow illustrated in FIG. 3A, the object 300 may be placed at a fixed distance 370 from the device 310. The object 300 may have an unknown reflectance value. At block 382, the object 300 may be illuminated at the fixed illuminance of the light source 320. The light emitted from the light source 320 (shown as light 350) may travel to the object 300 and reflect off of a surface of the object 300. At block 384, the reflected illuminance may be measured. For example, a portion of light 360 may reflect off of the object 300 and may be measured by the light sensor 340, or in some embodiments, the portion of light 360 may be detected or measured by the camera 330. At block 386, the object reflectance is calculated. For example, using the light source illuminance value, the measured reflected illuminance, and the distance 370, the object reflectance is calculated.

In FIG. 3B, an example reflectance table 390 is depicted. The reflectance table 390 may include data such as data for objects used in the reflectance calibration process of FIG. 3A. The object identifiers used during the reflectance calibration process of FIG. 3A may be stored along with associated reflectance values in various orientations of an object. For example, in a lab environment, empirical data for objects and associated reflectance values in various orientations may be collected and stored as a set of reflectance data in the reflectance table 390 or in another reflectance library. The reflectance table 390 may be populated based on aggregate data across a number of users, based on empirical data, based on user-specific data (e.g., a user's living room, etc.), and other sources. Using the reflectance table 390, embodiments of the disclosure may compare detected or measured reflectance values to one or more values in the reflectance table 390 to identify objects and/or a specific orientation of an object. For example, the reflectance table 390 may include a first reflectance value for an aluminum soda can in a first orientation, and a second reflectance value for the aluminum soda can in a second orientation. The reflectance table 390 may include reflectance data for objects at a fixed distance. Using the reflectance table 390, objects or materials in a scene may be recognized, and/or distances between a light source and an object may be determined.

In some embodiments, a flat field characterization may be used to account for different positioning of objects with respect to a camera. For example, a light source may be used to illuminate a gray chart and the geographic intensity variation on the flat scene may be used to generate values for the formulae presented above. Using the flat field characterization generated for a particular light source intensity, expected reflectance values for objects can be determined at different locations within a field of view.

Figure 4:
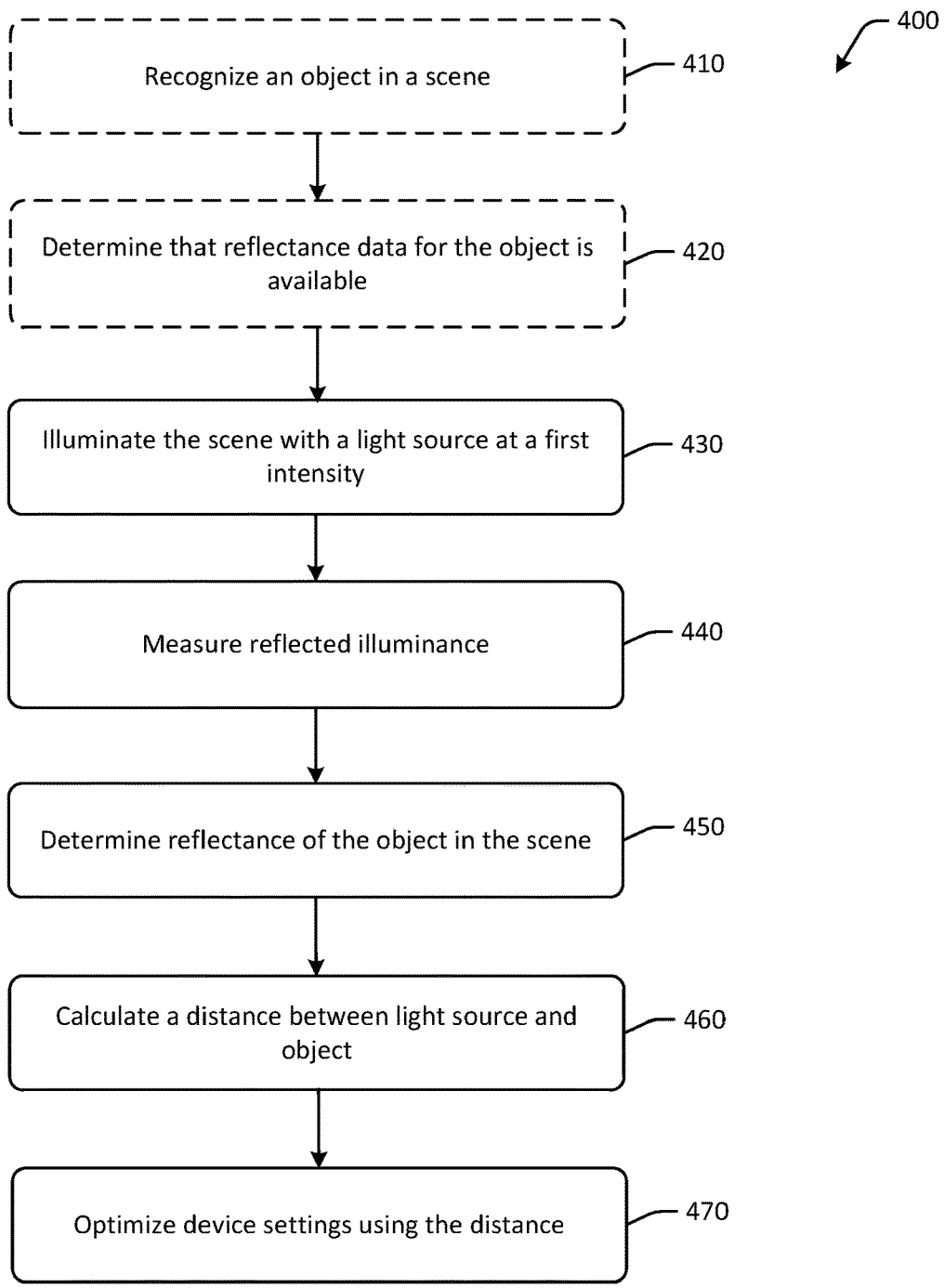
FIG. 4 is a process flow diagram of an illustrative method for determining a depth of objects in accordance with one or more example embodiments of the disclosure.

FIG. 4 is a process flow diagram of an illustrative method 400 for determining a depth of objects in accordance with one or more example embodiments of the disclosure. At optional block 410, an object in a scene may be recognized. For example, in certain embodiments, object recognition algorithms may be employed to recognize certain objects in a scene. At optional block 420, a determination may be made as to whether reflectance data for a recognized object is available.

At block 430, the scene may be illuminated with a light source at a first intensity. At block 440, reflected illuminance of light reflected from objects in the scene may be measured. At block 450, a reflectance of the object in the scene is determined. Using the reflectance, an orientation of the object may be determined. At block 460, a distance between the light source and the object is calculated using the first intensity value, the reflected illuminance, and the object reflectance. At block 470, device settings are optimized or adjusted using the distance. For example, exposure settings for a camera device may be optimized or otherwise adjusted. Additional examples of settings that may be adjusted and/or optimized may include exposure time, such as sensor exposure time, analog and/or digital gain (e.g., at the sensor or imaging system), tone mapping curve (e.g., gamma curve) adjustments or selection, contrast settings, color settings (e.g., Y balance, color saturation, etc.), color-biased hardware adjustments in certain embodiments, color correction settings, and the like. In some embodiments, other device settings may be optimized, such as flash device intensity. For example, using the object reflectance, flash intensity or brightness may be optimized (e.g., the brighter an object in the scene is, flash intensity may be reduced, or flash intensity may be increased for relatively less bright objects).

Figure 5:
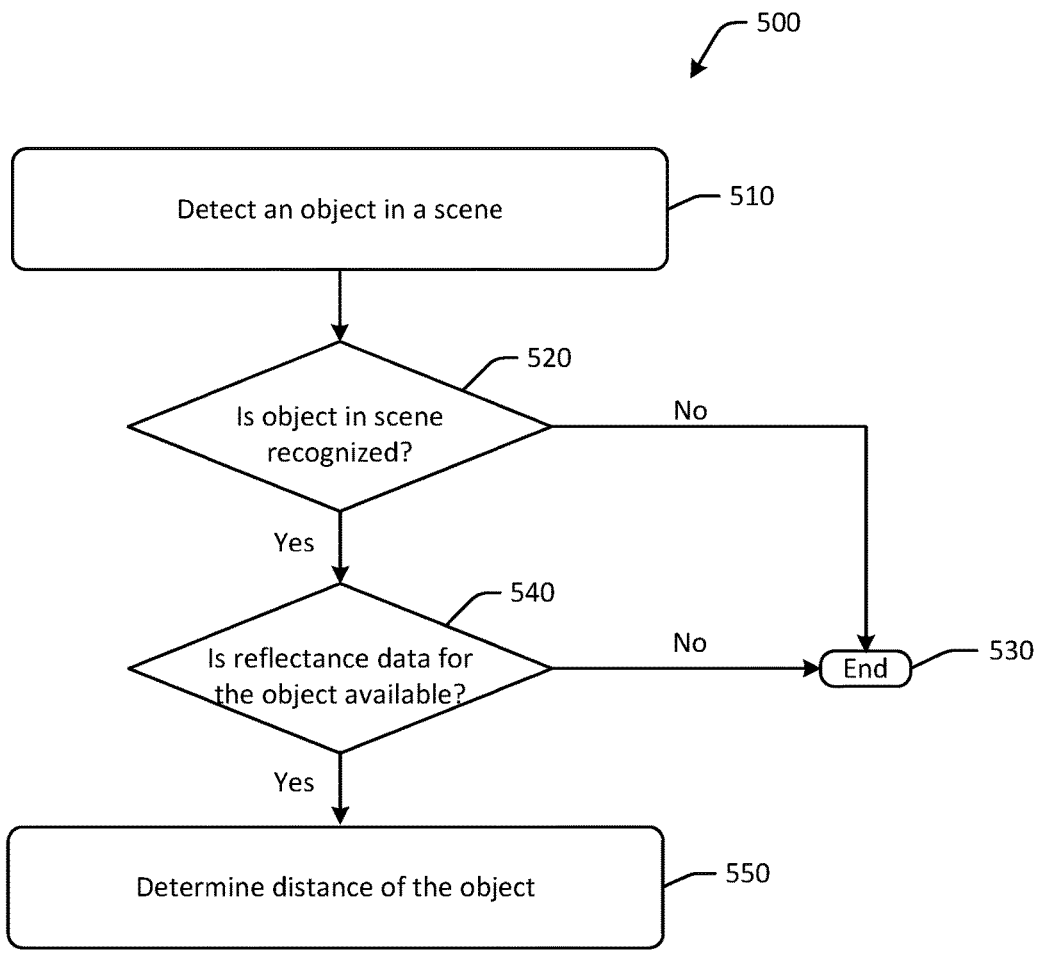
FIG. 5 is a process flow diagram of an illustrative method for determining a depth of objects in accordance with one or more example embodiments of the disclosure.

FIG. 5 is a process flow diagram of an illustrative process flow 500 for determining a depth of objects in accordance with one or more example embodiments of the disclosure. At block 510, an object in a scene is detected. At determination block 520, a determination is made as to whether the object in the scene is recognized. If it is determined that the object in the scene is not recognized, the process flow 500 ends at block 530. If it is determined that the object in the scene is recognized, the process flow 500 proceeds to determination block 540. At determination block 540, a determination is made as to whether reflectance data is available for the object. If it is determined that reflectance data for the object is not available, the process flow 500 ends at block 530. If it is determined that reflectance data for the object is available, the process flow 500 proceeds to block 550, at which a distance of the object is determined.

Figure 6:
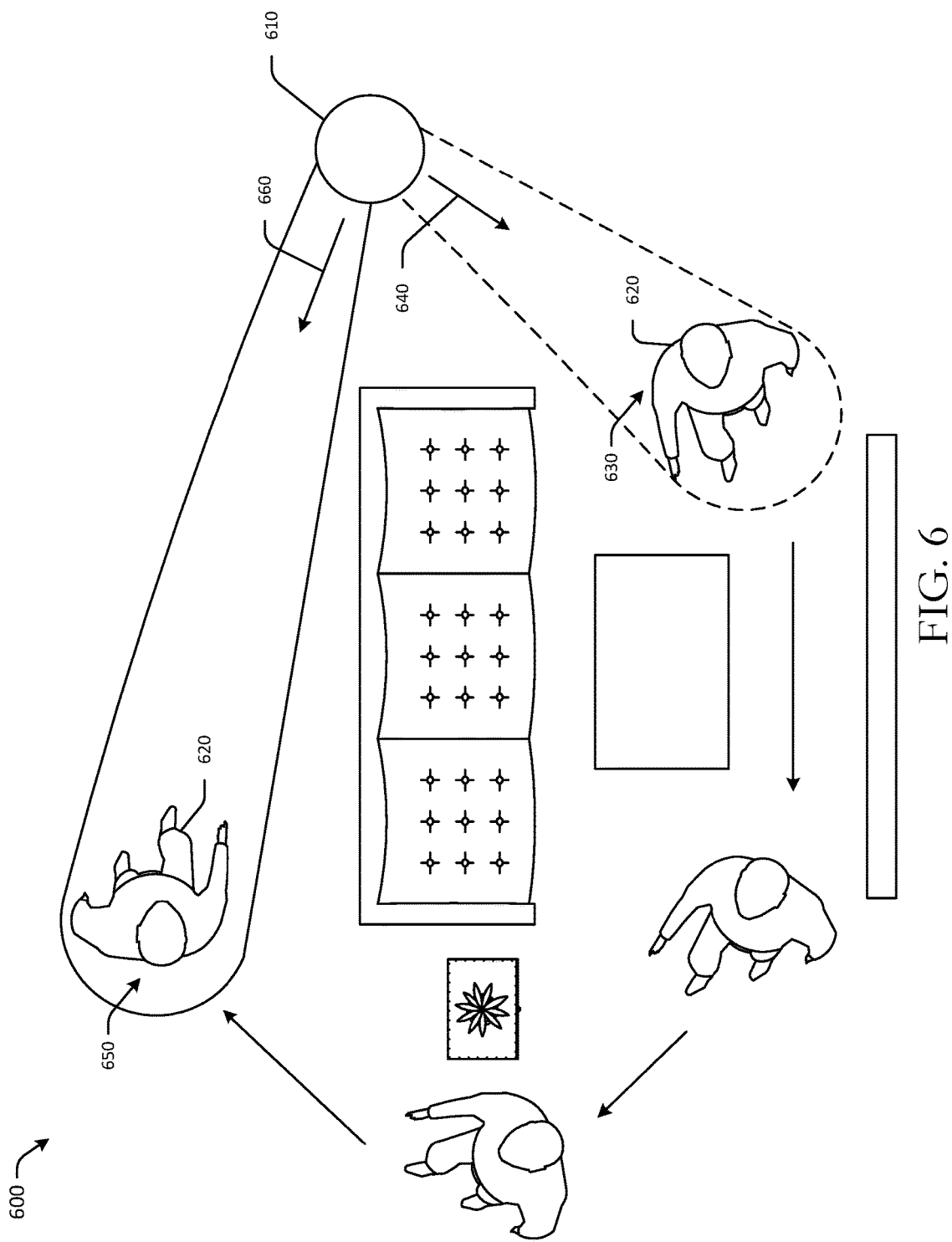
FIG. 6 is a schematic diagram of an example use case for determining a depth of objects in accordance with one or more example embodiments of the disclosure.

FIG. 6 is a schematic diagram of an example use case for determining a depth of objects in accordance with one or more example embodiments of the disclosure. In FIG. 6, a speaker device 610 may be placed in an ambient environment 600. The speaker device 610 may include sound directing technology or may be otherwise configured to adjust sound strength and direction. For example, when a user 620 is in a first position 630, the speaker device 610 may direct sound 640 towards the user 620 at a specific signal strength based at least in part on a distance between the speaker device 610 and the user 620. As the user 620 moves about the ambient environment 600, the speaker device 610 may continuously update a location and/or distance of the user 620, and may direct sound in the user's direction. For example, as the user 620 moves to a second position 650, the speaker device 610 may determine a distance between the speaker device 610 and the user 620, and may direct sound in direction 660 towards the user 620. The speaker device 610 may also adjust a strength, volume, or intensity of the sound based at least in part on the distance between the speaker device 610 and the user 620. As a result, sound output from the speaker device 610 may be optimized for the user 620.

One or more operations of the method, process flows, or use cases of FIGS. 1-6 may have been described above as being performed by a smart tag, or more specifically, by one or more program modules, applications, or the like executing on a device. It should be appreciated, however, that any of the operations of methods, process flows, or use cases of FIGS. 1-6 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired, or in the order as described, in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
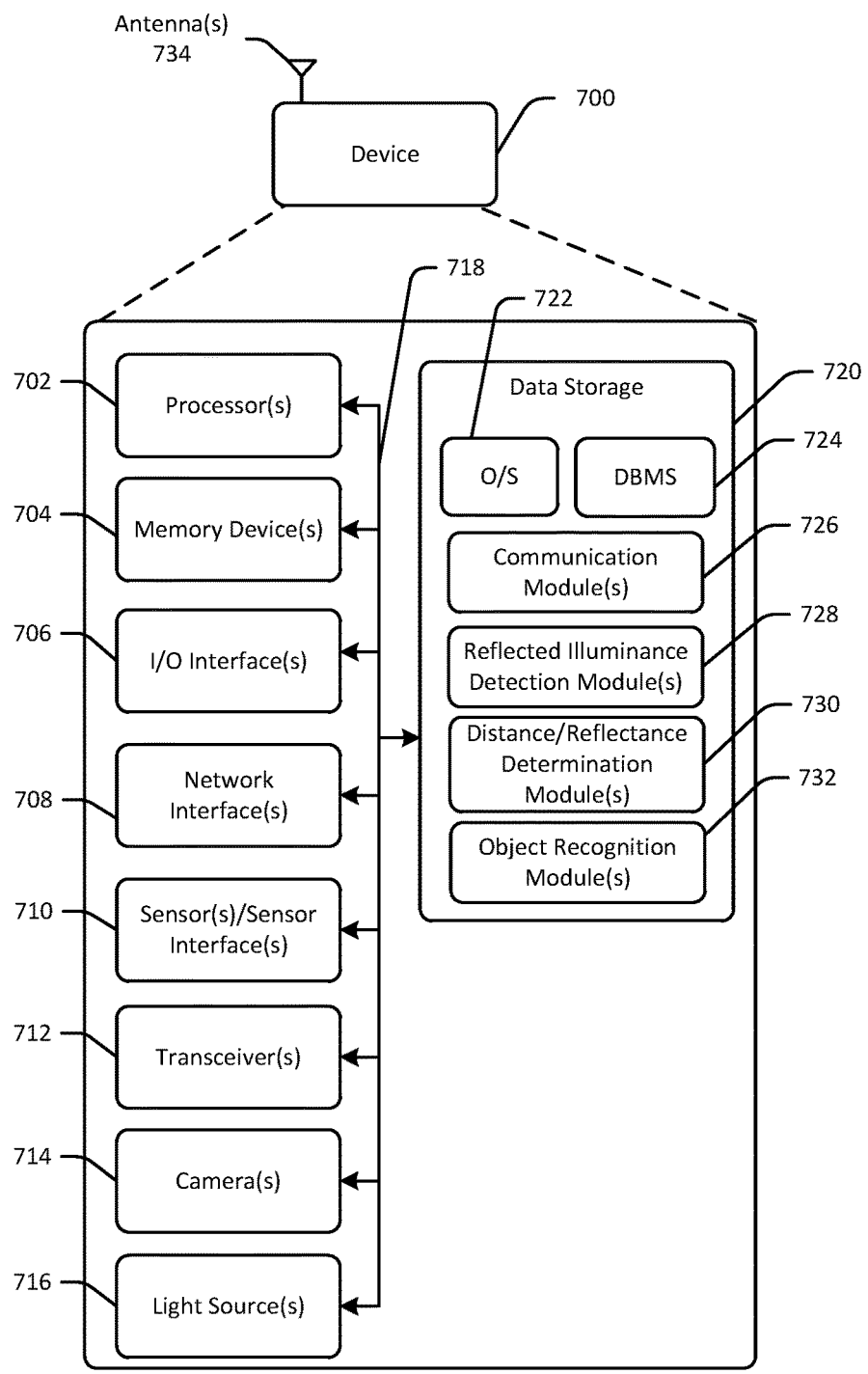
FIG. 7 is a schematic block diagram of a device in accordance with one or more example embodiments of the disclosure.

FIG. 7 is a schematic block diagram of an illustrative device 700 in accordance with one or more example embodiments of the disclosure. The device 700 may include any suitable computing device including, but not limited to, a mobile device such as a smartphone, tablet, e-reader, wearable device, or the like; a desktop computer; a laptop computer; a content streaming device; a set-top box; or the like. The device 700 may correspond to an illustrative device configuration for the electronic tracking tags of FIGS. 1-6.

The device 700 may be configured to communicate via one or more networks (not shown), such as an Internet of Things network, with one or more servers, user devices, or the like. For example, in the illustration of FIG. 7, the device 700 may be configured to communicate with one or more remote server(s).

The device 700 may be configured to communicate via one or more networks. Such network(s) may include, but are not limited to, any one or more different types of communications networks such as, for example, Internet of Things networks, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 700 may include one or more processors (processor(s)) 702, one or more memory devices 704 (generically referred to herein as memory 704), one or more input/output ("I/O") interface(s) 706, one or more network interface(s) 708, one or more sensors or sensor interface(s) 710, one or more transceiver(s) 712, one or more camera(s) 714, one or more light source(s) 716, and data storage 720. The device 700 may further include one or more buse(s) 718 that functionally couple various components of the device 700. The device 700 may further include one or more antennas 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the device 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722, one or more database management systems (DBMS) 726, and one or more program modules, applications, engines, computer-executable code, scripts, or the like such as, for example, one or more communication module(s) 726, one or more reflected illuminance detection module(s) 728, one or more distance/reflectance determination module(s) 730, and one or more object recognition module(s) 732. Some or all of these modules may be sub-modules. Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the device 700. Any data stored in the data storage 720 may be loaded into the memory 704 for use by the processor(s) 702 in executing computer-executable code. In addition, any data depicted as being stored in the data storage 720 may potentially be stored in one or more datastore(s) (not shown) and may be accessed via the DBMS 726 and loaded in the memory 704 for use by the processor(s) 702 in executing computer-executable code. The datastore(s) may include, but are not limited to, databases (e.g., relational, object-oriented, etc.), file systems, flat files, distributed datastore(s) in which data is stored on more than one node of a computer network, peer-to-peer network datastore(s), or the like.

The processor(s) 702 may be configured to access the memory 704 and execute computer-executable instructions loaded therein. For example, the processor(s) 702 may be configured to execute computer-executable instructions of the various program modules, applications, engines, or the like of the device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program modules depicted in FIG. 7, the communication module(s) 726 may include computer-executable instructions, code, or the like that responsive to execution by one or more of the processor(s) 702 may perform functions including, but not limited to, sending and/or receiving information, such as sending or receiving images, distance information, reflectance information, and the like.

The reflected illuminance detection module(s) 728 may include computer-executable instructions, code, or the like that responsive to execution by one or more of the processor(s) 702 may perform functions including, but not limited to, activating or triggering a light source and/or a light sensor, processing captured or measured data, determining reflected illuminance values, and the like.

The distance/reflectance determination module(s) 730 may include computer-executable instructions, code, or the like that responsive to execution by one or more of the processor(s) 702 may perform functions including, but not limited to, determining an estimated distance or estimated reflectance of one or more objects in a scene.

The object recognition module(s) 732 may include computer-executable instructions, code, or the like that responsive to execution by one or more of the processor(s) 702 may perform functions including, but not limited to, recognizing one or more objects in a scene, generating bounding boxes about recognized objects, and the like.

Referring now to other illustrative components depicted as being stored in the data storage 720, the O/S 720 may be loaded from the data storage 720 into the memory 704 and may provide an interface between other application software executing on the device 700 and hardware resources of the device 700. More specifically, the O/S 720 may include a set of computer-executable instructions for managing hardware resources of the device 700 and for providing common services to other application programs (e.g., managing memory allocation among various application programs). In certain example embodiments, the O/S 720 may control execution of one or more of the program modules depicted as being stored in the data storage 720. The O/S 720 may include any operating system now known or which may be developed in the future including, but not limited to, any server operating system, any mainframe operating system, or any other proprietary or non-proprietary operating system.

The DBMS 726 may be loaded into the memory 704 and may support functionality for accessing, retrieving, storing, and/or manipulating data stored in the memory 704 and/or data stored in the data storage 720. The DBMS 726 may use any of a variety of database models (e.g., relational model, object model, etc.) and may support any of a variety of query languages. The DBMS 726 may access data represented in one or more data schemas and stored in any suitable data repository. In certain example embodiments, the DBMS 726 may be any suitable light-weight DBMS optimized for performance on a mobile device.

Referring now to other illustrative components of the device 700, the input/output (I/O) interface(s) 706 may facilitate the receipt of input information by the device 700 from one or more I/O devices as well as the output of information from the device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 734 to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The device 700 may further include one or more network interface(s) 708 via which the device 700 may communicate with any of a variety of other systems, platforms, networks, devices, and so forth. The network interface(s) 708 may enable communication, for example, with a wireless router, a host server, and/or one or more web servers via one or more network(s).

The antenna(s) 734 may include any suitable type of antenna depending, for example, on the communications protocols used to transmit or receive signals via the antenna(s) 734. Non-limiting examples of suitable antennas may include directional antennas, non-directional antennas, dipole antennas, folded dipole antennas, patch antennas, multiple-input multiple-output (MIMO) antennas, or the like. The antenna(s) 734 may be communicatively coupled to one or more transceivers 712 or radio components to which or from which signals may be transmitted or received.

As previously described, the antenna(s) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 734 may additionally, or alternatively, include a Wi-Fi antenna configured to transmit or receive signals in accordance with established standards and protocols, such as the IEEE 702.11 family of standards, including via 2.4 GHz channels (e.g. 702.11b, 702.11g, 702.11n), 5 GHz channels (e.g. 702.11n, 702.11ac), or 60 GHZ channels (e.g. 702.11ad). In alternative example embodiments, the antenna(s) 734 may be configured to transmit or receive radio frequency signals within any suitable frequency range forming part of the unlicensed portion of the radio spectrum.

The antenna(s) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 734—transmitting or receiving radio frequency (RF) signals in the bandwidth and/or channels corresponding to the communications protocols utilized by the device 700 to communicate with other devices. The transceiver(s) 712 may include hardware, software, and/or firmware for modulating, transmitting, or receiving—potentially in cooperation with any of antenna(s) 734—communications signals according to any of the communications protocols discussed above including, but not limited to, one or more Wi-Fi and/or Wi-Fi direct protocols, as standardized by the IEEE 702.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, temperature sensors, humidity sensors, location sensors, and so forth. Example types of inertial sensors may include accelerometers (e.g., MEMS-based accelerometers), gyroscopes, and so forth.

The camera(s) 714 may be configured to determine a depth, capture images, focus on objects, generate a field of view, and the like. The light source(s) 716 may be configured to generate artificial light, including visible light and/or invisible light, at a predetermined intensity.

It should be appreciated that the program modules, applications, computer-executable instructions, code, or the like depicted in FIG. 7 as being stored in the data storage 720 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 700, and/or hosted on other computing device(s) accessible via one or more networks, may be provided to support functionality provided by the program modules, applications, or computer-executable code depicted in FIG. 7 and/or additional or alternate functionality. Further, functionality may be modularized differently such that processing described as being supported collectively by the collection of program modules depicted in FIG. 7 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 7 may be implemented, at least partially, in hardware and/or firmware across any number of devices.

It should further be appreciated that the device 700 may include alternate and/or additional hardware, software, or firmware components beyond those described or depicted without departing from the scope of the disclosure. More particularly, it should be appreciated that software, firmware, or hardware components depicted as forming part of the device 700 are merely illustrative and that some components may not be present or additional components may be provided in various embodiments. While various illustrative program modules have been depicted and described as software modules stored in data storage 720, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods, process flows, and use cases of FIGS. 1-6 may be performed by a device having the illustrative configuration depicted in FIG. 7, or more specifically, by one or more engines, program modules, applications, or the like executable on such a device. It should be appreciated, however, that such operations may be implemented in connection with numerous other device configurations.

The operations described and depicted in the illustrative methods and process flows of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method comprising:
    causing, by one or more computer processors coupled to at least one memory of a camera device, illumination of a scene within a field of view of the camera device, wherein the scene is illuminated at a first illuminance value;
    determining a first lux value of ambient light in the scene;
    determining a first reflectance value for a first object in the scene;
    determining, using the first reflectance value and an expected reflectance value for a human face, that the first object is at least partially a human face; and
    determining a first distance between the camera device and the human face based at least in part on the first illuminance value, the first lux value, and the first reflectance value.

2. The method of claim 1, further comprising:
    causing a focus setting for a camera of the camera device to be modified to focus on the human face based at least in part on the first distance.

3. The method of claim 1, wherein the human face is a first human face, the method further comprising:
    determining a second reflectance value for a second object in the scene;
    determining that the second object is at least partially a second human face;
    determining a second distance between the camera device and the second human face;
    determining an average of the first distance and the second distance; and
    causing a focus setting for a camera of the camera device to be modified based at least in part on the average.

4. The method of claim 1, further comprising:
    causing a volume setting of the camera device to be adjusted based at least in part on the first distance.

5. The method of claim 1, further comprising:
    determining a direction of the human face relative to the camera device; and
    causing a loudspeaker to direct sound in the direction.

6. The method of claim 1, further comprising:
    capturing an image of the scene, the image comprising at least one pixel having a pixel value;
    wherein determining the first reflectance value for the first object in the scene comprises using the pixel value to determine the first reflectance value.

7. The method of claim 1, further comprising:
    determining that the human face is in a front facing orientation.

8. The method of claim 1, further comprising:
    determining a user account associated with a user having the human face; and
    causing presentation of personalized information associated with the user at the camera device based at least in part on the user account.

9. A camera device comprising:
    at least one memory that stores computer-executable instructions; and
    at least one processor configured to access the at least one memory and execute the computer-executable instructions to:
    cause illumination of a scene within a field of view of the camera device, wherein the scene is illuminated at a first illuminance value;
    determine a first lux value of ambient light in the scene;
    determine a first reflectance value for a first object in the scene;
    determine, using the first reflectance value and an expected reflectance value for a human face, that the first object is at least partially a human face; and
    determine a first distance between the camera device and the human face based at least in part on the first illuminance value, the first lux value, and the first reflectance value.

10. The system of claim 9, wherein the at least one processor is further configured to access the at least one memory and execute the computer-executable instructions to:

cause a focus setting for a camera of the camera device to be modified to focus on the human face based at least in part on the first distance.

11. The system of claim 9, wherein the human face is a first human face, and wherein the at least one processor is further configured to access the at least one memory and execute the computer-executable instructions to:
   determine a second reflectance value for a second object in the scene;
   determine that the second object is at least partially a second human face;
   determine a second distance between the camera device and the second human face;
   determine an average of the first distance and the second distance; and
   cause a focus setting for a camera of the camera device to be modified based at least in part on the average.

12. The system of claim 9, wherein the at least one processor is further configured to access the at least one memory and execute the computer-executable instructions to:
   cause a volume setting of the camera device to be adjusted based at least in part on the first distance.

13. The system of claim 9, wherein the at least one processor is further configured to access the at least one memory and execute the computer-executable instructions to:
   determine a direction of the human face relative to the camera device; and
   cause a loudspeaker to direct sound in the direction.

14. The system of claim 9, wherein the at least one processor is further configured to access the at least one memory and execute the computer-executable instructions to:
   capture an image of the scene, the image comprising at least one pixel having a pixel value;
   wherein the at least one processor is configured to determine the first reflectance value for the first object in the scene by executing the computer-executable instructions to use the pixel value to determine the first reflectance value.

15. The system of claim 9, wherein the at least one processor is further configured to access the at least one memory and execute the computer-executable instructions to:
   determine that the human face is in a front facing orientation.

16. The system of claim 9, wherein the at least one processor is further configured to access the at least one memory and execute the computer-executable instructions to:
   determine a user account associated with a user having the human face; and
   cause presentation of personalized information associated with the user at the camera device based at least in part on the user account.

17. A camera device comprising:
   at least one memory that stores computer-executable instructions; and
   at least one processor configured to access the at least one memory and execute the computer-executable instructions to:
   cause illumination of a scene within a field of view of the camera device;
   determine a first reflectance value for a first object in the scene;
   determine, using the first reflectance value and an expected reflectance value for a human face, that the first object is at least partially a first human face in a front facing orientation; and
   cause a focus setting for the camera device to be modified to focus on the first human face.

18. The camera device of claim 17, wherein the at least one processor is further configured to access the at least one memory and execute the computer-executable instructions to:
   determine a second human face in the scene; and
   determine that the second human face is not in a front facing orientation.

19. The camera device of claim 17, wherein the at least one processor is further configured to access the at least one memory and execute the computer-executable instructions to:
   determine a first distance between the first human face and the camera device; and
   adjust a volume setting based at least in part on the first distance.

20. The camera device of claim 17, wherein the at least one processor is further configured to access the at least one memory and execute the computer-executable instructions to:
   determine a second human face in the scene;
   determine an average of a first distance between the first human face and the camera device and a second distance between the second human face and the camera device; and
   modifying a focus setting of the camera device based at least in part on the average.

* * * * *